United States Patent [19]

Hoover

[11] Patent Number: 5,062,290

[45] Date of Patent: Nov. 5, 1991

[54] HYDRAULIC CRIMPING PRESS FOR ELECTRICAL CONNECTORS

[75] Inventor: John B. Hoover, Manchester, N.H.

[73] Assignee: Burndy Corporation, Norwalk, Conn.

[21] Appl. No.: 544,264

[22] Filed: Jun. 25, 1990

[51] Int. Cl.[5] .................... B21D 41/04; B23P 11/00

[52] U.S. Cl. .................... 72/416; 72/453.16; 100/231

[58] Field of Search .................... 72/416, 410, 409, 402, 72/453.16, 453.15, 456, 407; 100/231

[56] References Cited

U.S. PATENT DOCUMENTS

| | | | |
|---|---|---|---|
| 305,836 | 9/1884 | Morgan | 72/456 |
| 676,292 | 6/1901 | Wigtel | 72/416 |
| 1,077,812 | 11/1913 | Derbyshire | 72/456 |
| 2,164,245 | 6/1939 | Kienzle | 100/231 |
| 3,732,718 | 5/1973 | Barberio | 72/410 |
| 4,055,980 | 11/1977 | Churla | 72/410 |
| 4,132,107 | 1/1979 | Suganuma | 72/416 |
| 4,292,833 | 10/1981 | Lapp | 72/410 |
| 4,942,757 | 7/1990 | Pecora | 72/416 |

*Primary Examiner*—Daniel C. Crane

*Attorney, Agent, or Firm*—Burtsell J. Kearns; Patrick J. Walsh

[57] ABSTRACT

A hydraulic tool for crimping electrical connectors having a die head subassembly in which the moveable power ram is constrained to axial movement along its power cylinder axis and prevented from rotating about the cylinder axis or canting as it moves outwardly of the cylinder during a connector crimping operation.

1 Claim, 2 Drawing Sheets

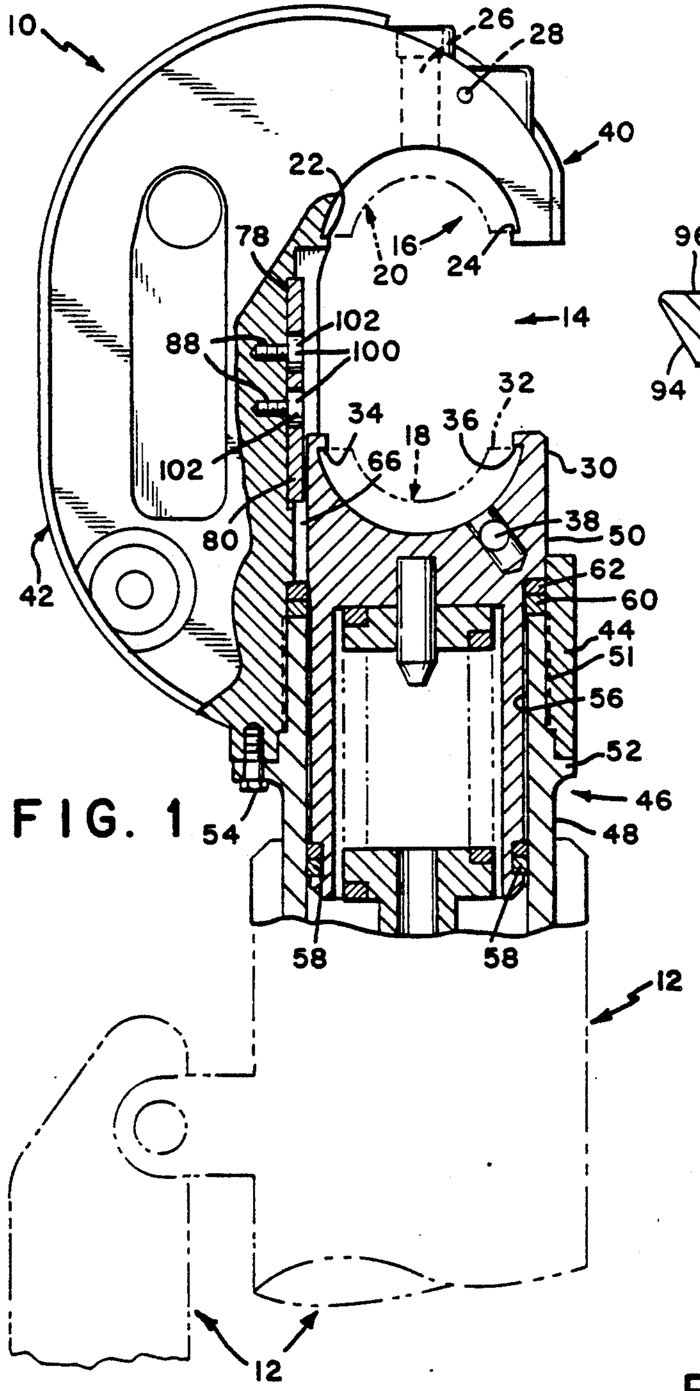
FIG. 1
FIG. 8
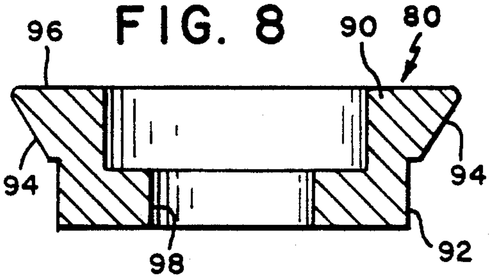
FIG. 9a
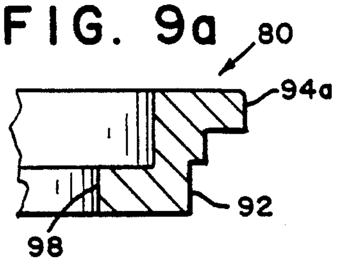
FIG. 9b
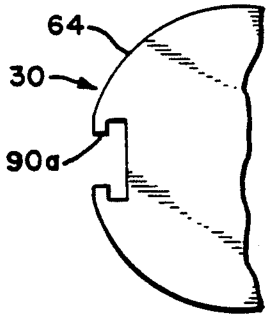
FIG. 7
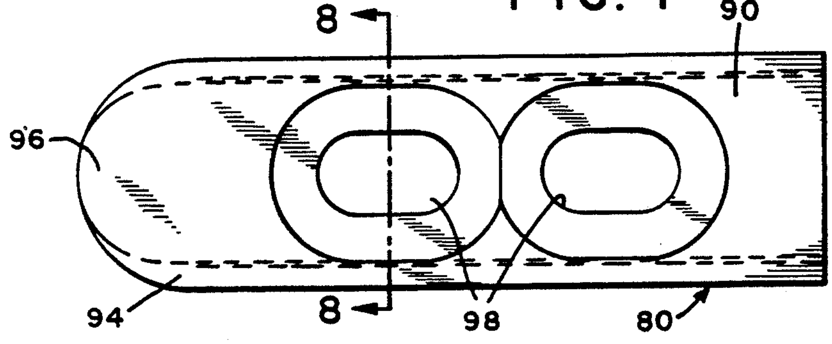

HYDRAULIC CRIMPING PRESS FOR ELECTRICAL CONNECTORS

BACKGROUND OF THE INVENTION

The present invention relates to crimping tools particularly to hydraulic crimping tools for affixing electrical connectors to wire transmission lines.

Hydraulic tools of this kind have been used for a number of years, as for example, Burndy Corporation HYPRESS Models Y35 and Y35-2. These tools include hydraulically driven dies for crimping electrical connectors onto transmission lines or for splicing transmission lines.

Hydraulic tools of this kind include a die head subassembly containing the crimping dies in which diehead can be rotated 180 degrees relative to operating handles for ease of positioning the crimping dies over a workpiece The hydraulic tool is operated by placing the dies in position over an electrical connector, actuating tool handles to advance a moveable die into position on a connector and to develop sufficient hydraulic force enabling the dies to crimp the connector. Approximately twelve tons of force are developed at the die head during a crimping operation. After crimping is complete, the tool is disengaged by releasing the hydraulic pressure, and retracting the moveable die.

The die head subassembly comprises a unitary C-shaped head defining a die cavity between a fixed upper jaw and a moveable lower jaw The upper jaw is in the form of a crescent and receives a U-shaped die cooperating with the lower die during a crimping operation. The lower jaw is preferably formed integral with a piston ram for sliding movement relative to the C-shaped head for advancing and retracting the lower die with respect to the upper die. The piston ram cooperates with a power cylinder and advances toward the upper die as hydraulic pressure is developed in the cylinder and retracts when the pressure is released.

The piston ram being cylindrical in form is free to rotate with respect to cylinder axis creating an opportunity for misalignment of the upper and lower die members during a crimping operation. As a result it is necessary to restrain the piston ram from rotation in order to have proper alignment of crimping dies.

In addition, crimping tools can become jammed when non-linear (i.e. non axial) forces are encountered when crimping odd-shaped connectors. The jamming occurs through tilting or cocking of the piston ram in the power cylinder when such non-linear forces are encountered Such jamming can be corrected by adding significant mass to the head to physically encapsulate the piston within the head. However, this results in a heavy and cumbersome tool head.

SUMMARY OF THE INVENTION

This invention suppresses, overcomes, and controls these non-linear forces and prevents jamming of the tool as well as misalignment of criming jaws The present invention is directed to hydraulic power tool in which the die head subassembly is provided with an arrangement for guiding the moveable die and piston ram in a true axial direction to prevent jamming of the piston ram particularly when odd-shaped connectors are crimped inducing non-linear forces Additionally, the invention restrains the piston ram from rotation in the cylinder and avoids consequent die misalignment.

OBJECTS OF THE INVENTION

It is an object of the invention to provide a new and improved hydraulic crimping tool in which the die head subassembly applies predictable crimping forces to connectors including irregular or odd shaped connectors.

Another object of the invention is to provide a hydraulic crimping tool in which the moveable crimping die moves along the tool axis without jamming in the power cylinder when non-linear crimping forces are encountered.

Another object of the invention is to provide a hydraulic crimping tool in which the crimping dies maintain alignment regardless of the shape of the connector being crimped.

Other and further objects of the invention will occur to one skilled in the art upon the employment of the invention in practice or upon an understanding of the following detailed description of the invention.

DESCRIPTION OF THE DRAWING

A preferred embodiment of the invention has been chosen for purposes of description and is shown in the accompanying drawing in which:

FIG. 1 is an elevational view partly in section of a die head subassembly for an hydraulic crimping tool according to the present invention.

FIG. 7 is a plan view of dove tail key according to the present invention.

FIG. 8 is a section view taken along line 8—8 of FIG. 7.

FIGS. 9*a* and 9*b* are fragmentary views of a T-shaped key member and complimentary piston ram channel.

DETAILED DESCRIPTION OF PREFERRED EMBODIMENT

Figure 2:
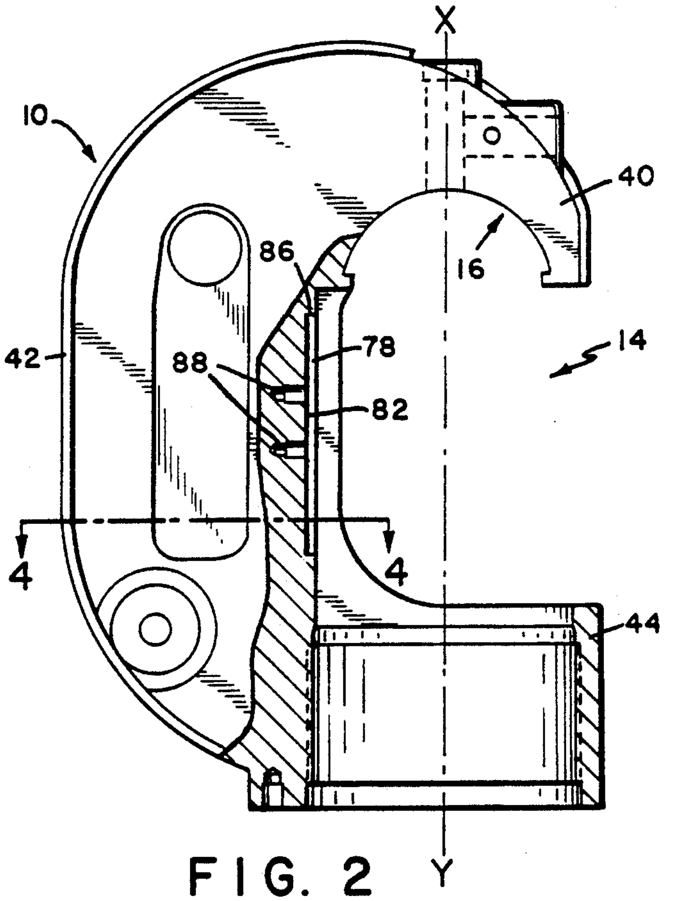
FIG. 2 is an elevational view partly in section of die head of a hydraulic crimping tool.
Figure 3:
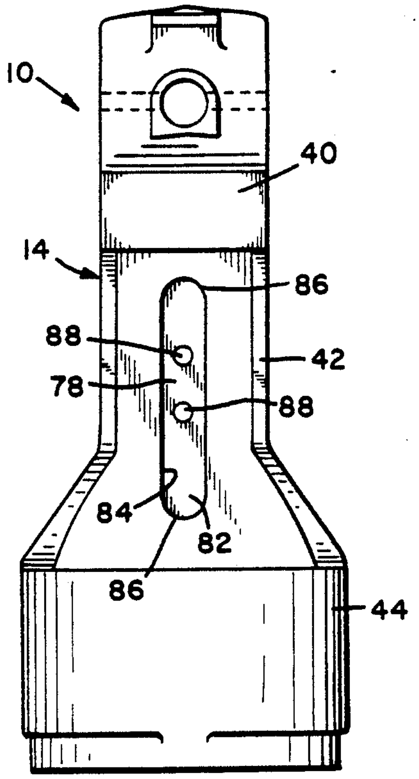
FIG. 3 is a front elevational view of the die head in FIG. 2.
Figure 4:
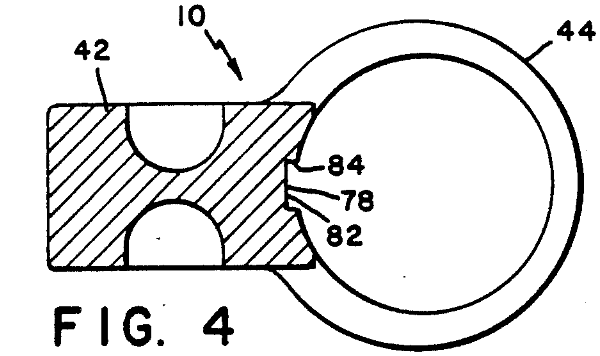
FIG. 4 is a section view taken along line 4—4 of FIG. 2.

Referring now to the drawing and particularly to FIG. 1, the hydraulic crimping tool according to the present invention comprises several major components including a rotatable C-shaped die head 10, a pump housing 12, and operating handles.

The die head assembly includes a unitary C-shaped head 10, preferably forged integral, defining a die cavity 14 between a fixed upper jaw 16 and a movable lower jaw 18. The upper jaw is in the form of a crescent and receives a U-shaped die 20 supported by spaced ridges 22, 24 and retained by a pin 26 and cooperating release shaft 28. The die slips transversely into position in the upper jaw crescent The lower jaw is also in the form of a crescent at the upper surface of a piston ram 30 receiving a lower U-shaped die 32 (preferably identical to the upper die) between spaced supporting ridges 34 and 36 being retained by a lock pin 38. As more fully described below, the upper and lower dies engage a connector workpiece (not shown) crimping it into place with substantial crimping force developed by operating the tool.

The die head is described as being generally C-shaped including an upper crescent 40, a spine 42, and a lower hub 44 in an integral forging. The lower hub receives a cylinder and piston subassembly 46. The cylinder 48 opens upwardly toward the die cavity for receiving a piston ram 50 in telescoping relation. The cylinder body is threaded at 51 along its upper surface above a circumferential ridge 52 for assembly and retention within tubular hub A suitable fastener 54 secures die head and cylinder body against relative rotation when assembled.

The piston ram 30 is slidably received within the cylinder bore 56 and is recessed at along its skirt to receive piston rings 58. A piston washer 60 and a wiper 62 are positioned at the cylinder open end.

Figure 5:
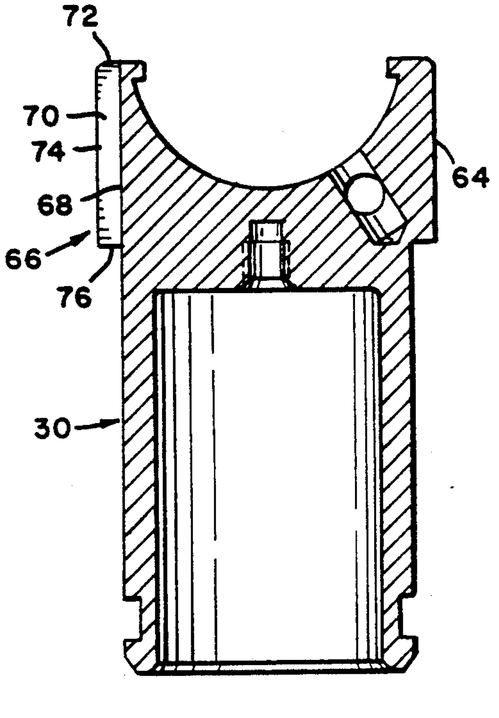
FIG. 5 is a side elevational view in section of a piston ram according to the invention.
Figure 6:
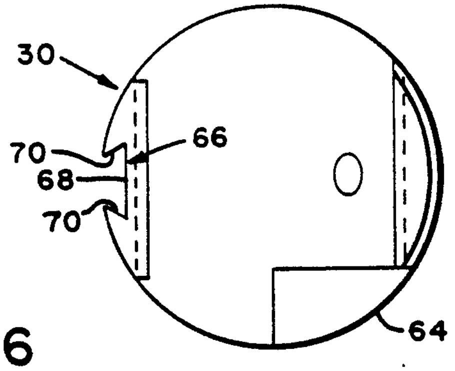
FIG. 6 is a plan view of the piston ram of FIG. 5.

Referring to FIGS. 5 and 6, the piston ram 30 at its upper side wall 64 is provided with dovetail channel 66 extending vertically and along the surface of the upper wall The dovetail channel is defined by channel base 68 and by converging side walls 70 extending from the base to the circumferential surface of the upper wall The channel is open at the top 72, side 74 and bottom 76 portions of the upper wall.

The C-shaped head is provided with a vertical recess 78 extending in confronting relation with the dovetail channel 66 for receiving a dovetail key 80 (FIGS. 7 and 8). As shown in FIGS. 1-4, the recess 78 faces the die cavity 14 of the C-shaped head and extends vertically, in parallel with the tool axis X—Y, and for a length sufficient to accommodate the excursionary distance travelled by the piston ram in a crimping operation. The recess itself has a base portion 82 and parallel die walls 84 which terminate in curved upper and lower ends 86. A pair of bores 88 extend into the die head for receiving dovetail key fasteners.

The dovetail key is shown in FIGS. 7 and 8 comprised an elongated bar 90 having a base portion 92 and an upper outwardly flaring top portion 94 terminating at top surface 96. A pair of elongated openings 98 extent through the key for receiving fasteners 100 for securing the key to the diehead recess. The openings are recessed to accommodate the head portions 102 of fasteners for smooth sliding movement of the piston ram dovetail channel over the dovetail key. The base portion 92 of the dovetail key fits into the recess 84 and is secured therein by suitable fasteners 100. The side walls of the dovetail key flair outward from the base portion and conform to the contour of the dovetail channel When assembled and operating, the piston ram is guided by the dovetail key to move in a true axial direction and is held in true axial alignment when encountering non-linear forces as when crimping an irregular shaped connector. In addition, the dovetail key and channel arrangement prevents the piston ram from rotating about the cylinder axis so that opposing die members maintain planar alignment for proper engagement and crimping of connectors.

In a modification by the key member shown in FIG. 9*a–b*, a T-shaped key may be used in which there is a T-shaped top portion **94*a* for engagement with a complementary shaped retaining channel 90*a* in the sidewall 64 of piston ram 30** shown in FIG. 9*b*.

I claim:

1. A hydraulic tool for crimping connectors comprising a C-shaped die head having a spine, a lower hub, and an upper jaw, a die fitted into the upper jaw defining a fixed die, a piston ram and cylinder subassembly secured to and together with the hub member aligned along the vertical tool axis, the piston ram having an upper side wall and an upper surface defining a low jaw, a die member fitted to the movable jaw defining a movable die, the fixed and movable dies aligned along the tool axis and cooperating to crimp connectors when the tool is actuated, the piston ram upper wall having a dovetail channel defined by a channel base and converging side walls extending vertically along the surface of the upper wall from its base to the circumferential surface of the upper wall, the channel being open at the top, side and bottom portions of the side wall, a recess in the spine portion of the C-shaped head extending vertically in parallel with the tool axis and in confronting relation with the dovetail channel and for a sufficient length to accommodate the excursionary distance travelled by the piston ram during a crimping operation, the recess having a base portion and parallel side walls, a dovetail key in the recess having a base portion conforming to the recess, side walls flaring outward from the base portion and conforming to the contour of the dovetail channel so that the circumferential surface and the coverging side walls of the channel form wall members for grasping the dovetail key whereby the piston ram is guided during the crimping operation by the dovetail key to move in a true axial direction being held in true axial alignment when encountering non-linear forces as when crimping an irregular shaped connector and for preventing the piston ram from rotating with respect to the tool axis or from moving laterally of the tool axis so that opposing die members maintain planar alignment for proper engagement and crimping of irregular shaped connectors.

* * * * *